Patented Apr. 3, 1951

2,547,677

UNITED STATES PATENT OFFICE 2,547,677

TURKEY BLACKHEAD CONTROL COMPOSITION

Emanuel Waletzky, Stamford, Conn., assignor to American Cyanamid Company, New York, N. Y., a corporation of Maine No Drawing. Application July 2, 1949, Serial No. 102,926

5 Claims. (Cl. 167—53.1)

This invention deals with veterinary remedial measures and more particularly, with new compositions and a method for the control of morbidity and mortality in turkeys due to enterohepatitis (blackhead).

Blackhead is recognized as one of the most destructive diseases in turkey husbandry. It is found in every area where turkeys are raised. This disease was one of the prime causes for the shifting of the turkey industry from the east to other less heavily infected sections of the United States.

The disease is considered to be caused by a protozoan organism called *Histomonas meleagridis*. These organisms are discharged in the droppings of the birds and seldom survive more than 24 hours in an unprotected condition. However, they have been found to be harbored in the egg of the common cecal worm *Heterakis gallinae*, and are capable of establishing an infection when the cecal worm egg is ingested by the turkey.

The most common symptoms of blackhead are drooping wings, lowered head, drowsiness, ruffled feathers and yellow-colored diarrhea. However, young birds may die without manifesting any of these symptoms. The mortality in a flock of young birds infected with blackhead may reach as high as 80 to 90%.

In general, with the possible exception of parenteral arsenical administration, which is, of course, uneconomic, the only method of controlling blackhead has been the controlling of the spread of infection. The healthy birds are isolated from the flock and the disease is allowed to run its course on the infected birds. The diseased birds, by and large, represent a complete loss to the farmer, inasmuch as the mortality rate runs in excess of 90%.

I have found that compounds of the general formula

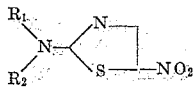

wherein $R_1$ and $R_2$ may be the same or different and represent alkyl radicals, will mitigate the course of the disease and will lead to almost 100% recovery of infected turkeys when administered to the birds within one week of infection.

These compounds have been found to be effective when administered by admixture, suspension or dispersion in the normal elements of sustenance ingested by the turkey. By normal elements of sustenance I include the feed and drink normally partaken by the birds such as grain, mash, scratch, water and/or other liquids.

The general range of concentration of the therapeutic agents in the total sustenance is from 0.01% or less to 1.5%. The optimal concentrations for effective therapy are in the range from 0.02% to 0.2% of the total feed or drinking water. With these optimal concentrations the daily drug intake for infected birds varies from 10 mg. of drug per kg. of body weight, to about 400 mg./kg. These amounts of drug may be administered to advantage in some cases by daily dosing with individual tablets or by drenching or otherwise.

In general, the precise dosage depends on the particular compound and the severity of the infection. The compounds, when administered at the requisite concentrations, show little or no toxic effects, and the nutrition, rate of growth and general well-being is not disturbed.

Test animals which were infected with *Histomonas meleagridis* by administering suspensions of infected cecal worm in amounts which killed more than 90% of the controls, recovered and flourished when these compounds were administered in the requisite amounts at any time after the infection had been established, up to as much as one week after the time of the infection. When the treatment has been delayed, administration should be in the range of the higher concentrations and should continue at these higher concentrations for at least two days. However, in the field these compounds may effectively be administered as prophylactic long term continuous treatments at the lower concentrations.

The compounds which, when mixed with turkey sustenance are the subject of this invention include: 2-dimethylamino-5-nitrothiazole; 2-diethylamino - 5 - nitrothiazole; 2-di-n-propylamino - 5 - nitrothiazole; 2-di-n-butylamino-5-nitrothiazole; 2-di-iso-butylamino - 5 - nitrothiazole; 2-di-n-amylamino-5-nitrothiazole; 2-methylethylamino-5-nitrothiazole; and related compounds.

In contrast to the above, many compounds not having the structure represented by the general formula have been found to be completely ineffective and in most instances severely toxic even though closely related structurally.

Although the birds may be given direct individual doses of these compounds by oral administration one or more times a day, the preferred method of treatment and the one which has yielded consistently good results is to allow them to feed ad libitum on the normal diet in which the effective compounds have been mixed or dispersed. Such vehicles of medication should contain enough of the drug so that the dosage ranges indicated above will be ingested in the course of fulfilling the daily food requirements of the bird.

The preferred method of supplying the compounds of the present invention for administration is to thoroughly disperse the therapeutic material in the birds' feed or drinking water in the concentration ranges indicated below. The higher concentration ranges are for those instances where the compounds are to be mixed with selected portions of the birds' daily rations, i. e., the mash or the water, the concentration being so regulated that the bird will daily ingest 10–400 mgs. of the drug per kg. of body weight.

Under conditions where the probability of infection is extremely high and it is desired to administer the compounds over a long period of time, it has been found effective to administer medicated mash containing 0.01% to 1.0% of these compounds to protect the birds from the deleterious consequences of the infection. Of course, if the infection has already been established, it is preferable to administer the compounds in higher concentrations ranging up to 1.5% by weight of the daily total sustenance intake.

These compounds may also be supplied to the turkeys by dissolving or dispersing them in the drinking water or other liquid constituents of the diet such as skim milk, buttermilk, or the like.

The drugs are dissolved, suspended or dispersed in liquids in concentrations up to 0.5% by weight. Where the drug is less soluble in the liquid, suspending and/or dispersing agents are used to assure the requisite concentration.

Since the compounds are believed to be novel the appended examples indicate a preferred synthesis of representative compounds from known starting materials. The other compounds coming within the scope of the disclosure can be prepared by analogous methods with analogous starting materials. Unless otherwise indicated all parts are by weight.

*Example 1*

375 parts of N,N-dimethylthiourea (Wallach, Ber. 32, 1874 (1899)) and 562 parts of chloroacetal were mixed with 600 parts water. The mixture was refluxed for 15 minutes and enough ethanol was then added to give a homogeneous solution. The refluxing was continued for one hour longer. The mixture was then distilled until the temperature in the flask reached 100° C. The residue was chilled, made alkaline with $Na_2CO_3$, extracted with ether, and the ether then back-extracted with 1:4 HCl. The acid solution was again made alkaline with $Na_2CO_3$ and extracted with ether. The ether extract was concentrated on the steam bath at reduced pressure to give a residue which crystallized readily in a dry ice bath but melted at room temperature. The residue was distilled at reduced pressure, boiling point 88–90° C./20 mm. The yield was 72% of theoretical of 2-dimethylaminothiazole: $N_D^{26}$: 1.5530–1.5533.

128 parts of 2-dimethylaminothiazole was added to 460 parts of chilled concentrated sulfuric acid, keeping the temperature below 20° C. The solution was further chilled and 75 parts of fuming nitric acid (density 1.5) was added in very small portions with continuous stirring. The initial reaction was vigorous and carried the temperature to 40° C. but was more easily controlled in the later stages, making it possible to keep the temperature in the range 15–20° C. When all the nitric acid had been added, the mixture was held for 30 minutes at room temperature and then poured over ice. A heavy yellow precipitate separated. The pH was adjusted in the range 7–8 with ammonium hydroxide and the solid material was filtered and dried. The yield of the crude product was 85%. The material was slightly soluble in hot dilute hydrochloric acid and was reprecipitated by ammonium hydroxide. It was then recrystallized from acetone in the presence of activated charcoal and gave a product of melting point 159–161° C. which was not raised by further recrystallization. The yield of pure 2-dimethyl-amino-5-nitrothiazole was 70%.

The above mentioned compound was incorporated in a mash which was fed ad libitum to turkeys infected with massive doses of *Histomonas meleagridis*. This mash mixture proved effective in preventing mortality due to "turkey blackhead" as compared to control turkeys which were similarly infected and fed the usual mash without any added therapeutic agent.

*Example 2*

To 366 parts of 1,1-diethyl-2-thiourea (Wallach, Ber. 32 1874 (1899)) was added 400 parts of dimethylchloroacetal and 11 parts of concentrated hydrochloric acid. The mixture was heated to reflux temperature until a self-sustaining reaction occurred. Heating was continued under reflux for a period of time amounting to 6 times the length of the elapsed time for the self-sustaining reaction. The mixture was then poured into 1500 parts of cold water, made strongly alkaline with sodium hydroxide, and was then extracted with ether. The ether was back-extracted with an excess of 1:4 solution of hydrochloric acid, the acid solution was then made strongly alkaline with NaOH and re-extracted with ether. The final ether extracts were combined and dried over anhydrous $K_2CO_3$. The ether was removed and the residue of 2-diethylaminothiazole was distilled at reduced pressure. It had a boiling point range 108–112° C./21–22 mm.; its refractive index was $N_D^{27}$: 1.5325–1.5328.

261 parts of 2-diethylaminothiazole was added to 920 parts of chilled sulfuric acid (d. 1.84). The addition was made in small portions and the sulfuric acid was constantly stirred and cooled in order that the temperature of the mixture did not rise above 20° C. 12 parts of fuming nitric acid (d. 1.5) was slowly added while the reaction mixture was cooled to the range 10–20° C. After 30 minutes of stirring at room temperature the resultant dark syrup was poured over ice and the gummy crystalline solid was filtered off. Neutralization of the filtrate with ammonium hydroxide gave a second crop of dark oil which solidified on standing. Both fractions were very soluble in most of the organic solvents except the petroleum fractions. They were purified by solution in ether, treated with activated charcoal and concentrated to a small volume by evaporation. Upon crystallization the melting point of 2-diethylamino-5-nitrothiazole was 52.5–53.5° C.

The above mentioned compound was incorporated in a mash which was fed ad libitum to turkeys infected with massive doses of *Histo-* monas meleagridis. This mash mixture proved effective in preventing mortality due to "turkey blackhead" as compared to control turkeys which were similarly infected and fed the usual mash without any added therapeutic agent.

I claim:

1. A medicated poultry and animal feed containing the elements of turkey sustenance and compounds of the general formula

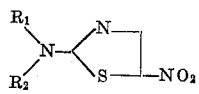

wherein $R_1$ and $R_2$ represent alkyl radicals.

2. A medicated poultry and animal feed containing the elements of turkey sustenance and compounds of the general formula

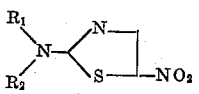

in which $R_1$ and $R_2$ are alkyl radicals in the concentration range of at least 0.01% by weight.

3. An agent for the control of blackhead in turkeys which comprises a turkey feed containing 2-dimethylamino-5-nitrothiazole in a concentration of at least 0.01%.

4. A agent for the control of blackhead in turkeys which comprises a turkey feed containing 2-diethylamino-5-nitrothiazole in a concentration of at least 0.01%.

5. An agent for the control of blackhead in turkeys which comprises a turkey feed containing 2-di-n-propylamino-5-nitrothiazole in a concentration of at least 0.01%.

EMANUEL WALETZKY.

REFERENCES CITED

The following references are of record in the file of this patent:

Chemical Abstracts, vol. 40, page 4058 (1946).
Farmer's Bulletin No. 1652, U. S. D. A. (1932), page 35.